(12) United States Patent
Bujan

(10) Patent No.: US 11,301,347 B2
(45) Date of Patent: Apr. 12, 2022

(54) SOFTWARE UPDATE MECHANISM FOR SAFETY CRITICAL SYSTEMS

(71) Applicant: Harman Becker Automotive Systems GmbH, Karlsbad (DE)

(72) Inventor: Eduardo Bujan, Ettlingen (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 79 days.

(21) Appl. No.: 16/345,651

(22) PCT Filed: Oct. 31, 2016

(86) PCT No.: PCT/IB2016/001560
§ 371 (c)(1),
(2) Date: Apr. 26, 2019

(87) PCT Pub. No.: WO2018/078406
PCT Pub. Date: May 3, 2018

(65) Prior Publication Data
US 2020/0057704 A1 Feb. 20, 2020

(51) Int. Cl.
*G06F 21/57* (2013.01)
*G06F 8/60* (2018.01)
(Continued)

(52) U.S. Cl.
CPC ........ *G06F 11/3051* (2013.01); *B60R 16/023* (2013.01); *G06F 8/60* (2013.01); *G06F 8/656* (2018.02); *G06F 21/572* (2013.01)

(58) Field of Classification Search
None
See application file for complete search history.

(56) References Cited

U.S. PATENT DOCUMENTS 6,378,069 B1 * 4/2002 Sandler ................. G06F 8/65
713/153
9,753,714 B1 * 9/2017 Irish ................. G06F 9/44526
(Continued)

FOREIGN PATENT DOCUMENTS

DE 102016100203 7/2016

OTHER PUBLICATIONS

International Search Report for PCT/IB2016/001560 dated Jul. 4, 2017.

*Primary Examiner* — Jason D Mitchell
(74) *Attorney, Agent, or Firm* — McCoy Russell LLP

(57) ABSTRACT

A software update monitor is configured to receive a software update intended for a safety critical control unit. The software update monitor determines a first verification code based on the received software update from a software update component and independently receives a second verification code associated with the software update from an update server. Next, it determines if the first verification code matches the second verification code. If the two codes match, the software update monitor effects the software update at the control unit. The software update monitor is configured to write the software update into a target memory location in a memory of the control unit. The software update monitor is configured to enable switching from a previous memory location, where an older software version may be running, to the target memory location, where the new software update is written, if the first and the second verification codes match.

20 Claims, 2 Drawing Sheets

(51) Int. Cl.
   *B60R 16/023*   (2006.01)
   *G06F 11/30*   (2006.01)
   *G06F 8/656*   (2018.01)

(56) References Cited

U.S. PATENT DOCUMENTS

| | | | | |
|---|---|---|---|---|
| 2004/0068721 A1* | 4/2004 | O'Neill | ............. | G06F 8/65 |
| | | | | 717/168 |
| 2009/0119657 A1* | 5/2009 | Link, II | ............. | G06F 8/64 |
| | | | | 717/171 |
| 2013/0007437 A1* | 1/2013 | Shroni | ............. | G06F 8/654 |
| | | | | 713/2 |
| 2014/0004825 A1* | 1/2014 | Prakash | ............. | H04W 12/06 |
| | | | | 455/411 |
| 2014/0033193 A1* | 1/2014 | Palaniappan | ............. | G06F 21/57 |
| | | | | 717/173 |
| 2014/0075197 A1 | 3/2014 | Alrabady | | |
| 2014/0114497 A1* | 4/2014 | Miyake | ............. | H04L 9/32 |
| | | | | 701/1 |
| 2014/0227976 A1* | 8/2014 | Callaghan | ............. | H04W 4/50 |
| | | | | 455/41.2 |
| 2014/0282458 A1* | 9/2014 | Gupta | ............. | G06F 8/65 |
| | | | | 717/168 |
| 2014/0380433 A1* | 12/2014 | Yerger | ............. | H04B 7/18506 |
| | | | | 726/4 |
| 2016/0012653 A1* | 1/2016 | Soroko | ............. | G07C 5/008 |
| | | | | 340/5.61 |
| 2016/0098266 A1 | 4/2016 | Martin | | |
| 2016/0364225 A1* | 12/2016 | Moeller | ............. | G06F 8/65 |
| 2017/0010875 A1* | 1/2017 | Martinez | ............. | G06F 21/575 |
| 2017/0060559 A1* | 3/2017 | Ye | ............. | G06F 8/65 |
| 2017/0168809 A1* | 6/2017 | Zander | ............. | G06F 8/35 |
| 2017/0324558 A1* | 11/2017 | Takemori | ............. | H04L 9/3226 |
| 2018/0081669 A1* | 3/2018 | Becker | ............. | H04L 63/0884 |
| 2018/0121656 A1* | 5/2018 | Scherer, III | ............. | G06F 11/1469 |
| 2018/0130056 A1* | 5/2018 | Smales | ............. | H04L 63/0838 |
| 2019/0025085 A1* | 1/2019 | Duret | ............. | G01D 5/2452 |
| 2019/0049912 A1* | 2/2019 | Poornachandran | ............. | |
| | | | | G06F 11/2033 |
| 2019/0050217 A1* | 2/2019 | Tatourian | ............. | B60W 50/00 |
| 2019/0056923 A1* | 2/2019 | Baba | ............. | G06F 8/61 |
| 2019/0349426 A1* | 11/2019 | Smith | ............. | H04L 69/22 |

\* cited by examiner

SOFTWARE UPDATE MECHANISM FOR SAFETY CRITICAL SYSTEMS

CROSS-REFERENCE TO RELATED APPLICATIONS

This application claims priority to and is the national phase of International Application No. PCT/IB2016/001560, filed on Oct. 31, 2016, entitled "SOFTWARE UPDATE MECHANISM FOR SAFETY CRITICAL SYSTEMS", the entire disclosure of which is expressly incorporated by reference in its entirety.

TECHNICAL FIELD

The present invention relates to a method and a system for updating software in units that are designed specifically under the context to fulfill critical safety requirements.

BACKGROUND

Systems that use software need updating of the software from time to time for reasons varying from adding new features to the existing system, improving on the existing software or fixing of bugs in the software, to name a few. The updating of software in systems or units that are designed specifically under the context to fulfill critical safety requirements is not as simple as an ordinary software update process for a non-safety critical unit or system. Safety critical systems are those systems whose failure or malfunction may result in very serious outcomes. For instance, it could lead to serious injury to human life or death, or severe damage to property or equipment or cause harm to the environment. Such safety critical systems can be found, for example, in the automotive and aviation industry. During a software update process in such safety critical systems, highly complex Electronic Control Units (ECUs) are updated. Therefore, a small pause, or break or fault during a software update in a system which is safety critical could lead to severely dangerous and highly undesirable outcome as compared to the outcome for a non-critical system. Therefore, the software update process has to be much more robust, safe and dependable when it comes to safety critical systems.

Current software update mechanisms are not designed specifically under the context to fulfill critical safety requirements, for example when used to update a compliant ISO26262 Electronic Control Unit (ECU) or a system in the automotive industry, like complex driving assistance ECUs. Modifying existing solutions, for example in the automotive industry targeting from Automotive Safety Integrity Level (ASIL) A up to ASIL D ISO26262 system requirements, would result in a highly costly, challenging and troublesome process.

Also, the software update process for systems that are highly critical must be secure, authentic and verified for correctness, failing which the system could function erroneously or could develop bugs and may crash in future.

There exists no such secure software update mechanism specifically designed for systems that are required to fulfil critical safety requirements, without actually having to alter or redevelop any existing software update mechanism, infrastructure, validation and logic related to non-safety or lower safety critical systems.

BRIEF SUMMARY OF THE EMBODIMENTS

According to one of many embodiments, there is provided a software update monitor configured to receive a software update from a software update component. The software update monitor determines a first verification code based on the received software update. The software update monitor then receives a second verification code associated with the software update from an update server. Next, the software update monitor determines if the first verification code matches with the second verification code. In case the first verification code matches with the second verification code, the software update monitor then effects or applies the software update.

According to an embodiment the software update is intended for a control unit. In another embodiment the control unit is a safety critical control unit.

Implementing a secure software update mechanism using a software update monitor in control units as described herein, for example, in control units that need to comply with safety standards, would give the benefit of avoiding insecure and unreliable software update processes in those control units and at the same time it gives the advantage of not having to alter or redevelop any existing infrastructure, logic or validation processes. The software update monitor can be easily integrated into the existing systems with no or minimum modifications and cost. Additionally it reduces complexity of the system as well as development and certification costs, thereby giving a feasible solution. The software update monitor ensures that the software update is from an authentic source and the data integrity of the software update is maintained. Only after the software update monitor is assured of the data and source verification results the software update is implemented. Thereby, software in safety critical compliant control units can be updated in a safe and hassle-free manner.

According to one embodiment, the software update monitor is configured to write the software update into a target memory location in a memory of the control unit. The software update monitor is further configured to enable switching from a previous memory location, where an older software version may be running, to the target memory location, where the new software update with the latest version of the software is written, only if the first verification code matches with the second verification code. The advantage of pushing the task of writing the software update onto the software update monitor instead of the software update component is that the software update monitor ensures integrity and authenticity of the software update.

According to one of many embodiments a system for implementing a software update in a control unit is provided which comprises of an update server for supplying a software update for the control unit. The system further comprises a software update component for receiving the software update from the update server and processing the software update. According to an embodiment the software update component may contain an update logic that is executed on receipt of the software update. In an exemplary embodiment the software update component processes the software update by way of compression or decompression of the software update as may be necessary depending on the nature of the software update received by the software update component. There may be other update logic executed by the software update component on the software update it receives from the update server to process the software update.

The system also comprises a software update monitor. The software update monitor is connected to the update server and the software update component independently. The software update monitor is arranged to receive a software update from the software update component. The software update sent by the software update component to the monitor may or may not be the same software update received by the update component from the update server. According to an embodiment the software update component processes the software update and sends this processed software update to the monitor. According to another embodiment the software update component sends the same software update that it had received from the update server. The software update monitor then determines a first verification code from the received software update.

In an alternative embodiment, the software update monitor receives the software update from the software update component and processes the software update according to an update logic present on the monitor.

The connection of the software update monitor with the update server is separate and independent from the connection of the software update monitor with the software update component. This ensures that the software update component does not tamper with, affect or influence the communication channel between the software update monitor and the update server. Therefore, when the second verification code is transmitted by the update server to the software update monitor, the software update component cannot snoop on or pick up the second verification code. This ensures complete separation of the transmission of the second verification code from the first verification code.

According to one of many embodiments, the software update monitor further comprises a trusted execution environment for source authentication and data validation of the software update from the software update component. An exemplary trusted execution environment may be a Trusted Platform Module (TPM). In an embodiment the trusted execution environment has a dedicated storage where the software update monitor may store one or more of the verification codes, signatures or any information pertaining to data integrity and authenticity of the software update for use in future. The trusted execution environment provides a platform to check the authenticity of the software update to make sure the software update is coming from a genuine source. It also checks the integrity of the data for consistency and correctness. It makes the overall mechanism secure and protected.

According to one of many embodiments the verification codes comprise a corresponding data verification factor and a corresponding source authentication factor. The software update contains information that is used by the software update monitor to verify if the data in the software update is correct and also to check if the software update is coming from an authentic source. The data verification factor and the source authentication factor are the important information elements in the verification codes that indicate towards data integrity and source authenticity. This helps the software update monitor to decide whether to go ahead with the intended software update or stall the software update, in case there is discrepancy in the data verification factor and/or the source authentication factor.

According to one of many embodiments, the software update is signed by a Root Certificate Authority at the update server. The advantage of signing by an RCA is that the software update may then be assessable for authenticity by the software update monitor using the RCA signature.

According to one of many embodiments, the software update monitor performs a data integrity check and a source integrity check on the software update received from the software update component to derive the data verification factor and the source authentication factor of the first verification code respectively. The data verification factor gives information as to the correctness and consistency of the software code in the software update. The source authentication factor indicates whether the software update is coming from a trusted or a genuine source. In case of discrepancy, the software update monitor can decide not to go ahead with effecting the software update onto the control unit and thereby avoid any mishaps in future due to an unreliable, spurious or an inaccurate software update.

According to one of many embodiments, the data integrity check carried out by the software update monitor comprises a Cyclic Redundancy Code (CRC) check. Using a CRC check the software update monitor can assess the integrity of the software. This error-detecting code can detect accidental changes to raw data in the software update.

According to one of a number of embodiments, the control unit complies with safety critical requirements of ISO26262 or IEC61508 standard. These standards are used for functional safety of electrical and/or electronic systems in production automobiles. ISO 26262 addresses the needs for an automotive-specific international standard that focuses on safety critical components. IEC61508 is a generic functional safety standard for electrical and electronic (E/E) systems. According to another embodiment, the control unit supports Automotive Safety Integrity Level (ASIL) A up to ASIL D. The software update monitor would update the software in such control units complying with such safety critical standards in a safe and secure manner so as not to interfere with the smooth functioning of the control unit and would keep the update process simple and hassle-free. The existing infrastructure and mechanism also need not be greatly modified to integrate the software update monitor.

According to an embodiment, the control unit is an automotive Electronic Control Unit (ECU). The software update monitor can be integrated into an existing system which is used for updating software of an automotive ECU, with the added advantage of providing a mechanism that helps the automotive ECU to continue being compliant with its safety critical standards.

Using a software update monitor as disclosed herein removes the need to invest in costly, challenging and troublesome modifications to systems targeting up to ASIL D ISO 26262 system requirements.

According to an embodiment a method for implementing a software update in a control unit is provided. The method comprises a first step of receiving the software update at a software update component from an update server and supplying the software update to a software update monitor. The next step constitutes writing the software update into a target memory location in a memory of the control unit by the software update monitor. The software update monitor has the permission and owns the necessary right to access the target memory location and write into it.

The next step constitutes calculating a first verification code for the software update by the software update monitor. Then a second verification code associated with the software update is received from an update server by the software update monitor. The software update monitor then determines if the first and second verification codes match. In case the first and second verification codes match, the software update monitor effects the software update at the control unit.

According to one of many embodiments, the step of effecting the software update further comprises enabling switching from a previous memory location to the target memory location if the first and second verification codes match. This ensures that the software update is already available at the target memory location and no time is lost in updating of the software into the control unit once it is determined that the software update is correct and genuine.

According to an alternative embodiment the monitor executes the write operation only after determining that both verification codes match. This would avoid unnecessary write operations into the memory thereby enhancing efficiency and security in case the software update received from the software update component is not authentic or genuine.

The order of the steps as per the various disclosed embodiments is not limiting and the steps may be carried out in a different order than the ones disclosed as long as the result to be achieved is the same.

According to one of many embodiments, switching from the previous memory location to the target memory location takes place at a next power on/off sequence or during a safe state. This ensures minimum interference to an already running control unit and makes sure that the new software update does not cause any adverse effects or hamper the functioning of the safety critical control unit.

According to an embodiment the method is executed on a Hardware Security Module, or similar trusted execution environment, present on a microcontroller. According to one embodiment, examples of a microcontroller that could fulfill this are Infineon Auryx family, Renesas RH850 P1X or ARM Trustzone. The Hardware Security Module on a microcontroller provides the necessary platform to execute the disclosed method in a secure and reliable manner.

According to an embodiment if the first verification code matches the second verification code the software update monitor generates a positive system notification else the software update monitor generates a negative system notification. The system notification helps the system as well as a user to track the progress of the software update process.

According to an embodiment the step of switching comprises sending a switch signal to the memory unit by the software update monitor for switching from the previous memory location to the target memory location. The switch signal ensures a timely swapping from the previously running software version stored in a previous memory location to the latest updated software version stored in the target memory location.

BRIEF DESCRIPTION OF THE DRAWINGS

The present invention may be better understood from reading the following description of non-limiting embodiments, with reference to the attached drawings, wherein.

DETAILED DESCRIPTION OF THE EXEMPLARY EMBODIMENTS

Figure 1:
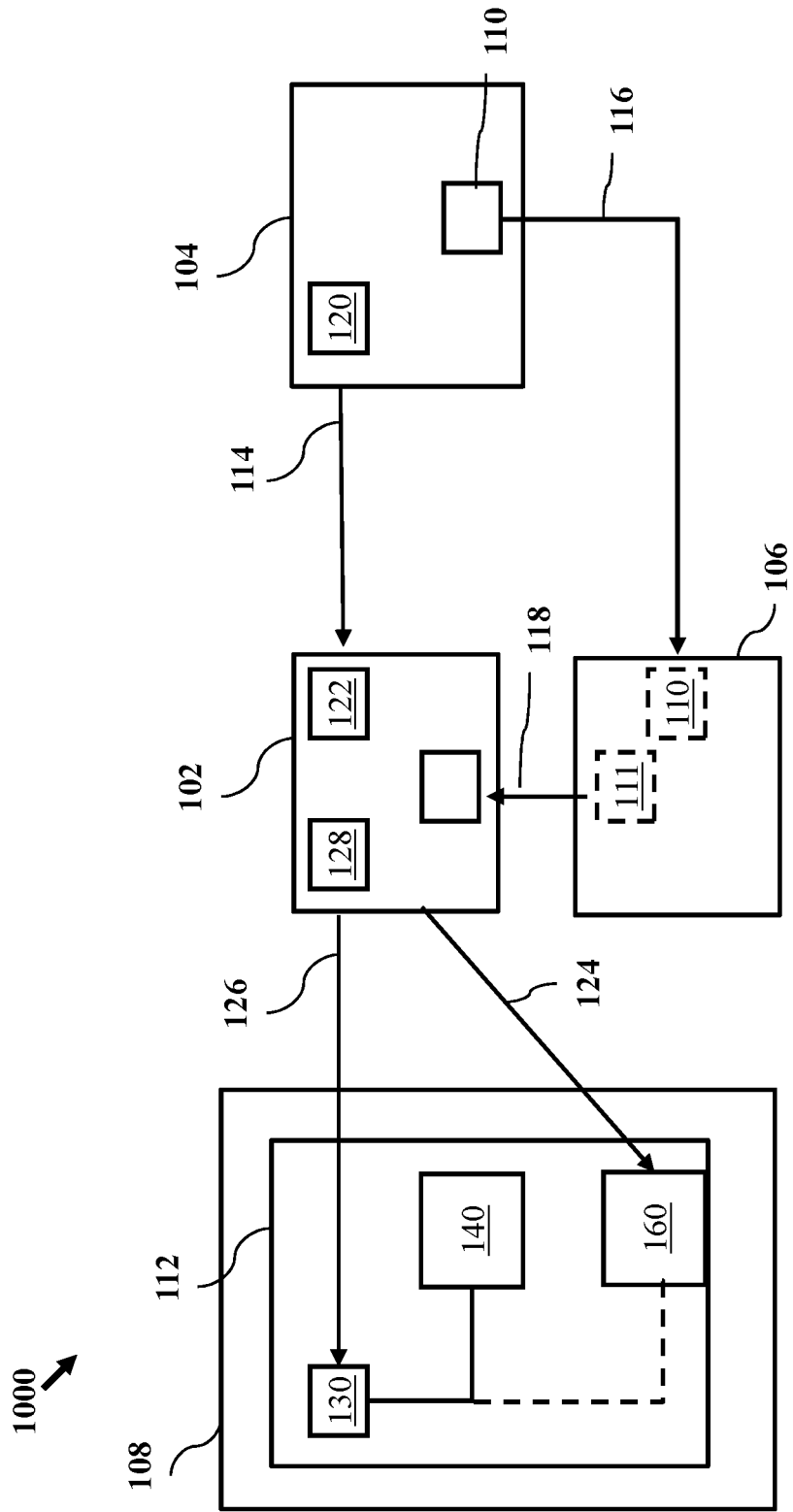
FIG. 1 schematically shows an example system in accordance with one of a number of embodiments of the present invention.

FIG. 1 shows an example system 1000 in accordance with one of a number of embodiments. The system 1000 comprises a software update monitor 102, an update server 104 and a software update component 106. The software update monitor 102 is connected with the update server 104 and the software update component 106 via independent and secure connections or channels 114, 116. The software update monitor 102 is further connected to a control unit 108 where a software update 110, 111 is intended to be installed via secure channel 124.

The update server 104 supplies the software update 110 to the software update component 106 over a secure connection 116. According to an embodiment the software update 110 comprises new software code and additional data that is used for determining data integrity and checking source authenticity of the new software update 110. According to one of many embodiments the software update 110 may be supplied to the software update component 106 in parts or whole. According to an embodiment the software update 110 is a software image.

The software update component 106 receives and processes the software update 110 by executing any update logic that might be necessary and subsequently forwards the software update 110 or 111, as applicable, to the software update monitor 102 via a secure channel 118. In a conventional software update process, the software update component 106 would directly proceed to writing the software update 110, 111 into a target memory location 160 in the control unit 108. Whereas, according to an embodiment as shown in FIG. 1, the software update monitor takes over the task of writing the software update into the target memory location 160 in the control unit 108 via a separate channel 124. In one of many embodiments, once the software update 110, 111 is ready at the software update component 106 to be uploaded into the memory 112, the software update component notifies the software update monitor 102 that the intended new software is complete and ready for upload the software update monitor 102 proceeds to write into the target memory location 160 in the memory 112 reserved for the new version of the software.

The software update monitor 102, on receiving the software update 110 or 111 from the software update component 106 also checks the software update 110 or 111 for correctness. The software update monitor 102 determines a first verification code 122 from the software update 110 or 111 received from the software update component 106. The software update monitor 102 receives a second verification code 120 directly from the update server 104 over a secure communication channel 114 which is independent of the secure channel 116 between the update server 104 and the software update component 106. In other words, the second verification code 120 is sent via channel 114 to the software update monitor 102, which is parallel in respect of channel 116. The second verification code is, therefore, unaffected by the software update component 106.

According to an embodiment the software update monitor 102 comprises a trusted execution environment 128. It provides the necessary features for maintaining security, confidentiality and isolation of the data in the software update 110, 111. According to an embodiment the trusted execution environment 128 is one of a Trusted Platform Module (TPM), a Hardware Security Module or an ARM Trustzone.

The software update monitor 102 checks the software update 110 or 111 received from the software update component 106 for determining data integrity and checking source authenticity of the new software update 110, 111. The software update monitor 102 determines a first verification code 122 from the software update 110, 111 and compares it to the second verification code 120 received independently from the update server 104. According to an embodiment the verification code 120, 122 contains information about the integrity of the data in the software update as well as the authenticity of the source of the data.

When the first 122 and the second 120 verification codes are found to match, the software update monitor 102 carries out the software update at the control unit 108 such that the new software version starts running on the control unit 108.

The control unit 108 shown in FIG. 1 is a safety critical unit which requires a safe and secure software update mechanism to update from an older version to a new version of its software without any glitches. In one of many embodiments the control unit is compliant to the standard ISO26262, IEC61508 or Automotive Safety Integrity Level (ASIL) A up to ASIL D.

The control unit 108 includes a memory 112 where software codes are written and stored. According to FIG. 1, the older software version is available in a previous memory location 140 of the memory 112 and a new software version is written in a target memory location 160 of memory 112. The software update monitor 102 writes the software update into the target memory location 160 in the memory 112 via a secure channel 124. The memory 112 may be volatile or non-volatile depending on the nature of the control unit 108 and the function it performs. According to one of many embodiments the memory 112 is a storage unit comprising any one or combination of primary and secondary storage devices. These may include Random Access Memory (RAM), Read Only Memory (ROM), cache memory, direct or sequential access storage devices.

The control unit 108 further comprises a switch 130 connected to the memory 112. The switch 130 is controlled by the software update monitor 102. The switch 130 is configured to receive a signal 126 from the software update monitor 102. When the signal 126 received from the software update monitor 102 is positive, the switch 130 switches from the previous memory location 140 containing an older software version to the target memory location 160 containing the new software version which was intended to be updated on to the control unit 108. Once the switching to the target memory location 160 is carried out the new software version is up and running on the control unit 108. Thereby, the software update monitor 102 brings about the software update at the control unit 108.

However, when the signal 126 received from the software update monitor 102 is negative, the switch 130 does not switch from the previous memory location 140 containing an older software version to the target memory location 160 containing the new software version which was intended to be updated on to the control unit 108. Therefore, the older software version in the previous memory location 140 continues to run and the new software version stored in the target memory location 160 is not executed by the control unit 108. The system 1000 then awaits the next software update from the update server 104.

According to one of many embodiments, the switch 130 is a module controlled by the software update monitor 102 which carries out or enables switching from an old to a new version of the software introduced by the software update. According to an exemplary embodiment, the switch 130 is a function embedded in the software update monitor 102. According to another embodiment the switch 130 is a function in the control unit 108. According to another exemplary embodiment the switch 130 is a function or module, for example, boot loader.

Figure 2:
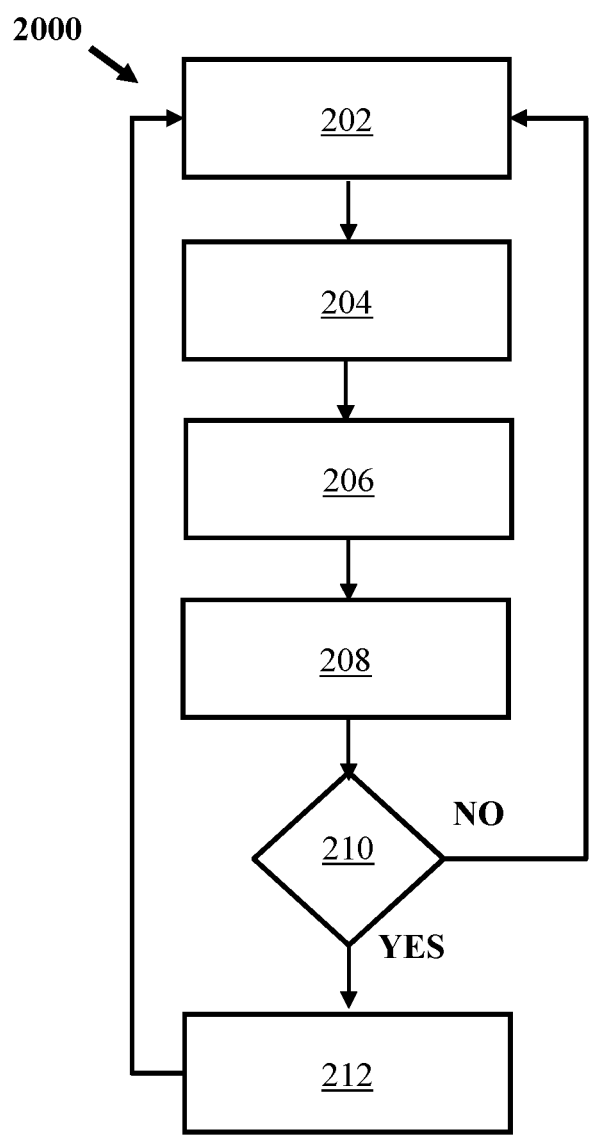
FIG. 2 is a flow chart for an example method in accordance with one of a number of embodiments of the present invention.

FIG. 2 is a flowchart illustrating a method 2000 in accordance with one of many embodiments. The method 2000, as depicted in FIG. 2, provides for implementing a software update 110, 111 in a control unit 108. The method 2000 comprises a first step 202 of receiving the software update 110 at a software update component 106 from an update server 104 and supplying the software update 110 or 111 to a software update monitor 102 after executing any update logic that might be necessary by the software update component to process the software update. On receiving the complete software update 110, 111 from the software update component 106, the software update monitor 102 proceeds to the step 204 of writing the software update 110, 111 into a target memory location 106 in the memory 112 of the control unit 108.

The software update monitor 102 then carries out the next step of 206 calculating the first verification code 122 for the software update 110, 111. According to an embodiment the software update monitor 102 utilizes information related to integrity of data and authenticity of source contained in the software update 110, 111 to determine the first verification code 122.

It may be noted that the software update 111 sent by the software update component 106 to the monitor 102 may or may not be the same software update 110 received by the update component 106 from the update server 104. According to an embodiment the software update component 106 processes the software update 110 and sends this processed software update 111 to the monitor 102. According to another embodiment the software update component 106 sends the same software update 110 that it had received from the update server 104.

The next step 208 comprises receiving a second verification code 120 associated with the software update 110 from the update server 104 at the software update monitor 102. This second verification code 120 is independently generated and transmitted to the software update monitor 102 via a secure communication channel 114 as depicted in FIG. 1. According to an embodiment the second verification code 120 is produced at the update server 104 for the entire software update 110, when the software update is transmitted to the software update component 106 in parts via a backend communication channel 116 from the update master server 104 to the software update component 106.

The next step 210 comprises determining if the first 122 and second 120 verification codes match. The matching of the two verification codes 120, 122 is to ensure that the software update version written into the memory 112 of the control unit 108 is devoid of any errors and data integrity issues. It also ensures that the new software version in the software update 110, 111 is an authentic version coming from a correct source. Only when the first verification code 122 matches the second verification code 120 the software update monitor 102 carries out the next step of 212 effecting or applying the software update 110, 111 at the control unit 108.

According to an embodiment of the method 2000, the step 212 of effecting or applying the software update 110, 111 at the control unit 108 further comprises a step of enabling switching from the previous memory location 140 to the target memory location 160 of the memory 112 if the first 122 and second 120 verification codes match. In case the first 122 and second 120 verification codes do not match during the step 210 of determination carried out by the software update monitor 102, then previous version of the software continues to run in the control unit 108 and no switching to the newly written version in the memory 112 takes place. When the next software update is available the steps of the method 2000 are carried out all over again.

The description of embodiments has been presented for purposes of illustration and description. Suitable modifications and variations to the embodiments may be performed in light of the above without departing from the scope of protection as determined by the claims.

In particular, whilst some of the above examples are described in connection with safety critical units complying with ASIL requirements, the method and system disclosed herein can also be implemented in other set ups involving different safety standards.

What is claimed is:

1. A software update monitor configured to:
via instructions stored in non-transitory memory of a microcontroller,
receive at the software update monitor, from a software update component, a software update that has been sent from an update server to the software update component and processed by the software update component, the software update component having a first communication channel to the software update monitor over which the software update was sent; then
write the software update into a target memory location of a control unit;
at the software update monitor, determine a first verification code based on the received software update;
receive at the software update monitor, from the update server, a second verification code associated with the software update, the update server having a second communication channel to the software update monitor over which the second verification code was sent;
determine if the first and second verification codes match; and
effect the software update previously written into the target memory location of the control unit if the first and second verification codes match.

2. The software update monitor of claim 1, wherein the software update monitor effects the software update by enabling switching from a previous memory location to the target memory location if the first and second verification codes match; and wherein the previous memory location and the target memory location are in a memory of the control unit.

3. The software update monitor of claim 1, wherein the processing of the software update by the software update component comprises the software update component decompressing the software update.

4. The software update monitor of claim 1, wherein the update server, the software update monitor, the software update component, and the control unit are separate components.

5. A system for implementing a software update in a control unit, the system comprising:
an update server for supplying the software update for the control unit;
a software update component for receiving the software update from the update server and processing the software update from the update server; and
a software update monitor connected to the update server and the software update component independently, wherein the software update monitor is arranged and includes instructions stored in non-transitory memory of a microcontroller to:
receive the software update that has been processed by the software update component from the software update component at the software update monitor and determine a first verification code, the software update component having a first communication channel to the software update monitor over which the software update was sent,
receive at the software update monitor, from the update server, a second verification code associated with the software update, the update server having a second communication channel to the software update monitor over which the second verification code was sent, then
determine if the first and second verification codes match, and
write the software update into the control unit and effect the software update if the first and second verification codes match,
wherein the first verification code and the second verification code each comprise a corresponding data verification factor and a corresponding source authentication factor.

6. The system of claim 5, wherein the control unit is a safety critical control unit, and wherein the processing of the software update by the software update component comprises decompressing the software update.

7. The system of claim 5, wherein the software update monitor further comprises a trusted execution environment on the microcontroller for source authentication and data validation of the software update from the software update component.

8. The system of claim 5, wherein the corresponding data verification factor provides information as to a correctness and consistency of software code in the software update, and wherein the corresponding source authentication factor indicates whether the software update is coming from a trusted source.

9. The system of claim 8, wherein via the instructions stored in non-transitory memory of the microcontroller, the software update monitor performs a data integrity check and a source integrity check on the software update received from the software update component to derive the corresponding data verification factor and the corresponding source authentication factor of the first verification code respectively.

10. The system of claim 9, wherein the data integrity check comprises a Cyclic Redundancy Code check.

11. The system of claim 5, wherein the control unit complies with safety critical requirements of ISO26262 or IEC61508 standard.

12. The system of claim 5, wherein the control unit supports Automotive Safety Integrity Level A up to Automotive Safety Integrity Level D.

13. The system of claim 5, wherein the first communication channel directly connects the software update monitor and the software update component, and wherein the second communication channel directly connects the software update monitor and the update server.

14. A method for implementing a software update in a safety critical control unit, the method comprising the steps of:
receiving the software update at a software update component from an update server, the software update component processing and then supplying the software update that was processed to a software update monitor via a first communication channel the software update component has to the software update monitor; then
writing the software update into a target memory location in a memory of the control unit by the software update monitor;
calculating a first verification code for the software update by the software update monitor;

receiving a second verification code associated with the software update from the update server at the software update monitor via a second communication channel the update server has to the software update monitor;

determining if the first and second verification codes match; and effecting the software update at the control unit if the first and second verification codes match, wherein the software update monitor performs a data integrity check and a source integrity check on the software update received from the software update component to derive a corresponding data verification factor and a corresponding source authentication factor of the first verification code respectively.

15. The method of claim 14, wherein the step of effecting the software update further comprises the step of:

enabling switching from a previous memory location to the target memory location if the first and second verification codes match.

16. The method of claim 15, wherein switching from the previous memory location to the target memory location takes place at a next power on/off sequence or during a safe state.

17. The method of claim 14, wherein the first communication channel directly connects the software update component and the software update monitor, wherein the second communication channel directly connects the software update component and the update server, wherein the processing of the software update by the software update component comprises decompression of the software update, and wherein the second verification code is independently generated and directly transmitted to the software update monitor from the update server.

18. The method of claim 14, further comprising:

determining the first and second verification codes match;

downloading the software update at the control unit responsive to the first and second verification codes matching, wherein the software update is a first software update; then receiving a negative signal for switching to the first software update; and responsive to receiving the negative signal for switching to the first software update, running a software older than the first software update that has been downloaded, awaiting a second software update.

19. The method of claim 18, wherein the first software update that has been downloaded is not executed after receiving the negative signal for switching to the first software update.

20. The method of claim 14, wherein the corresponding data verification factor provides information as to a correctness and consistency of software code in the software update, and wherein the corresponding source authentication factor indicates whether the software update is coming from a trusted source.

* * * * *